(12) United States Patent
Roth et al.

(10) Patent No.: US 10,936,078 B2
(45) Date of Patent: *Mar. 2, 2021

(54) ACCOUNT MANAGEMENT SERVICES FOR LOAD BALANCERS

(71) Applicant: Amazon Technologies, Inc., Reno, NV (US)

(72) Inventors: Gregory Branchek Roth, Seattle, WA (US); Quynh Khac Nguyen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/899,531

(22) Filed: Feb. 20, 2018

(65) Prior Publication Data

US 2018/0275765 A1    Sep. 27, 2018

Related U.S. Application Data

(63) Continuation of application No. 15/243,612, filed on Aug. 22, 2016, now Pat. No. 9,900,350, which is a
(Continued)

(51) Int. Cl.
*H04L 29/06* (2006.01)
*G06F 3/01* (2006.01)
(Continued)

(52) U.S. Cl.
CPC .............. *G06F 3/017* (2013.01); *G06F 3/011* (2013.01); *G06F 3/0304* (2013.01);
(Continued)

(58) Field of Classification Search
CPC ........ G06F 3/017; G06F 3/0304; G06F 3/011; G06F 3/0484; G06F 3/0346;
(Continued)

(56) References Cited

U.S. PATENT DOCUMENTS 6,658,473 B1    12/2003  Block et al.
7,321,926 B1 *   1/2008  Zhang ................... G06F 9/5033
                                                                455/453
(Continued)

OTHER PUBLICATIONS

Patel et al., Ananta: cloud scale load balancing. In Proceedings of the ACM SIGCOMM 2013 conference on SIGCOMM (SIGCOMM '13). ACM, New York, NY, USA, 207-218. Aug. 2013.*
(Continued)

*Primary Examiner* — David Garcia Cervetti
(74) *Attorney, Agent, or Firm* — Hogan Lovells US LLP

(57) ABSTRACT

A configurable load balancer can be utilized in a multi-tenant environment, where the load balancer can incorporate, or utilize, an account management service operable to perform security tasks such as authentication, authorization, and session management. Customers can utilize the load balancer to control access that users have to resources associated with those customers, without having to build and maintain a dedicated user management system. By implementing security functionality at the load balancer level, traffic can be managed before reaching the resources, which can help to reduce traffic and load on the resources, and can also help to prevent attacks and secure sensitive information. Visibility into the traffic through the load balancer also allows for behavior and usage monitoring, which is helpful for tasks such as billing and usage limit enforcement.

20 Claims, 5 Drawing Sheets

Related U.S. Application Data continuation of application No. 14/083,227, filed on Nov. 18, 2013, now Pat. No. 9,424,429.

(51) Int. Cl.

| | | |
|---|---|---|
| *G06F 21/45* | (2013.01) | |
| *G06F 21/60* | (2013.01) | |
| *H04L 29/08* | (2006.01) | |
| *G06F 3/03* | (2006.01) | |
| *G06F 3/0346* | (2013.01) | |
| *G06F 3/0481* | (2013.01) | |
| *G06F 3/0484* | (2013.01) | |
| *G06F 3/0488* | (2013.01) | |

(52) U.S. Cl.
CPC .......... *G06F 3/0346* (2013.01); *G06F 3/0484* (2013.01); *G06F 3/04812* (2013.01); *G06F 21/45* (2013.01); *G06F 21/604* (2013.01); *H04L 63/083* (2013.01); *H04L 63/205* (2013.01); *H04L 67/1002* (2013.01); *G06F 3/04886* (2013.01)

(58) Field of Classification Search
CPC .... G06F 3/04812; G06F 21/604; G06F 21/45; G06F 3/04886; H04L 63/205; H04L 67/1002; H04L 63/083
See application file for complete search history.

(56) References Cited

U.S. PATENT DOCUMENTS

| | | | |
|---|---|---|---|
| 7,447,166 B1 * | 11/2008 | Kaluve | H04L 12/66 370/254 |
| 7,680,813 B2 | 3/2010 | Ushijima | |
| 7,698,708 B1 | 4/2010 | Lent et al. | |
| 7,779,091 B2 | 8/2010 | Wilkinson et al. | |
| 8,000,716 B2 | 8/2011 | Tsao et al. | |
| 8,150,820 B1 * | 4/2012 | Herbach | G06F 21/604 707/705 |
| 8,458,780 B1 | 6/2013 | Takkallapally et al. | |
| 8,555,274 B1 | 10/2013 | Chawla et al. | |
| 8,661,120 B2 | 2/2014 | Atchison et al. | |
| 8,763,091 B1 * | 6/2014 | Singh | H04L 63/0884 726/4 |
| 8,817,614 B1 | 8/2014 | Ben-Nun et al. | |
| 9,015,723 B2 | 4/2015 | Gilat et al. | |
| 9,148,414 B1 | 9/2015 | Roth et al. | |
| 9,176,757 B2 | 11/2015 | Pajuelo Gonzalez et al. | |
| 9,176,789 B2 | 11/2015 | Lowes et al. | |
| 9,237,155 B1 * | 1/2016 | Cavage | G06F 9/5077 |
| 9,276,942 B2 | 3/2016 | Srinivasan et al. | |
| 9,411,653 B2 | 8/2016 | Trammel et al. | |
| 9,424,429 B1 | 8/2016 | Roth | |
| 9,430,264 B2 | 8/2016 | Tang et al. | |
| 9,436,443 B2 | 9/2016 | Chiosi et al. | |
| 9,450,836 B2 | 9/2016 | Hammer et al. | |
| 9,489,399 B1 | 11/2016 | Laporte et al. | |
| 9,544,188 B2 | 1/2017 | Mordani et al. | |
| 9,645,840 B2 * | 5/2017 | Ennaji | G06F 9/45533 |
| 9,900,350 B2 | 2/2018 | Roth et al. | |
| 2001/0032197 A1 * | 10/2001 | Chandra | G06Q 50/06 705/412 |
| 2002/0049806 A1 | 4/2002 | Gatz et al. | |
| 2002/0080789 A1 | 6/2002 | Henderson et al. | |
| 2002/0129135 A1 | 9/2002 | Delany et al. | |
| 2002/0138577 A1 | 9/2002 | Teng et al. | |
| 2002/0147801 A1 | 10/2002 | Gullotta et al. | |
| 2002/0147813 A1 | 10/2002 | Teng et al. | |
| 2002/0156879 A1 | 10/2002 | Delany et al. | |
| 2002/0184496 A1 | 12/2002 | Mitchell et al. | |
| 2003/0014524 A1 | 1/2003 | Tormasov | |
| 2003/0187982 A1 * | 10/2003 | Petit | H04L 63/08 709/225 |
| 2003/0191848 A1 * | 10/2003 | Hesselink | H04L 67/125 709/229 |
| 2004/0019680 A1 * | 1/2004 | Chao | H04L 67/306 709/226 |
| 2004/0042470 A1 | 3/2004 | Cooper et al. | |
| 2004/0176075 A1 | 9/2004 | Schwarz et al. | |
| 2004/0264670 A1 | 12/2004 | Flores et al. | |
| 2005/0102387 A1 | 5/2005 | Herington | |
| 2006/0005237 A1 * | 1/2006 | Kobata | H04L 63/123 726/12 |
| 2006/0031506 A1 * | 2/2006 | Redgate | H04L 29/06 709/226 |
| 2006/0036743 A1 | 2/2006 | Deng et al. | |
| 2006/0064383 A1 | 3/2006 | Marking | |
| 2006/0143619 A1 | 6/2006 | Galchev et al. | |
| 2006/0209688 A1 * | 9/2006 | Tsuge | H04L 45/54 370/229 |
| 2007/0011685 A1 | 1/2007 | Yim et al. | |
| 2007/0156869 A1 | 7/2007 | Galchev et al. | |
| 2007/0223437 A1 | 9/2007 | Virgile | |
| 2008/0019375 A1 | 1/2008 | Charzinski et al. | |
| 2008/0027948 A1 | 1/2008 | Corley et al. | |
| 2008/0031496 A1 * | 2/2008 | Takagi | G06F 9/505 382/115 |
| 2008/0086482 A1 | 4/2008 | Weissman | |
| 2008/0098215 A1 | 4/2008 | Belgaied et al. | |
| 2008/0104652 A1 * | 5/2008 | Swenson | H04N 21/8545 725/118 |
| 2008/0144609 A1 * | 6/2008 | Kim | H04L 67/1014 370/352 |
| 2008/0172366 A1 | 7/2008 | Hannel et al. | |
| 2008/0184128 A1 * | 7/2008 | Swenson | H04N 19/167 715/738 |
| 2008/0253542 A1 | 10/2008 | Lee | |
| 2008/0288644 A1 | 11/2008 | Gilfix et al. | |
| 2009/0022298 A1 * | 1/2009 | Qiu | H04L 47/125 379/211.01 |
| 2009/0063665 A1 | 3/2009 | Bagepalli et al. | |
| 2009/0168981 A1 * | 7/2009 | Johnson | H04L 12/1457 379/114.14 |
| 2009/0177778 A1 | 7/2009 | Turk | |
| 2009/0249287 A1 | 10/2009 | Patrick | |
| 2009/0300210 A1 | 12/2009 | Ferris | |
| 2009/0323640 A1 | 12/2009 | Chakrabarti et al. | |
| 2009/0327908 A1 | 12/2009 | Hayton | |
| 2010/0088698 A1 * | 4/2010 | Krishnamurthy | H04L 63/10 718/1 |
| 2010/0190469 A1 | 7/2010 | Vanderveen et al. | |
| 2010/0195500 A1 * | 8/2010 | Sejimo | H04W 12/06 370/235 |
| 2010/0235522 A1 | 9/2010 | Chen et al. | |
| 2010/0251328 A1 | 9/2010 | Syed et al. | |
| 2010/0318570 A1 | 12/2010 | Narasinghanallur et al. | |
| 2011/0004926 A1 * | 1/2011 | O'Donnell, III | H04L 63/102 726/7 |
| 2011/0010721 A1 | 1/2011 | Gupta et al. | |
| 2011/0023028 A1 | 1/2011 | Nandagopal et al. | |
| 2011/0231443 A1 | 9/2011 | Hannel et al. | |
| 2011/0258083 A1 | 10/2011 | Ren | |
| 2012/0002542 A1 | 1/2012 | Xu et al. | |
| 2012/0039175 A1 | 2/2012 | Sridhar et al. | |
| 2012/0041829 A1 | 2/2012 | Rothschild et al. | |
| 2012/0066607 A1 | 3/2012 | Song et al. | |
| 2012/0066679 A1 | 3/2012 | Pappas et al. | |
| 2012/0072762 A1 | 3/2012 | Atchison et al. | |
| 2012/0078720 A1 | 3/2012 | Pappas et al. | |
| 2012/0089845 A1 | 4/2012 | Raleigh | |
| 2012/0110055 A1 | 5/2012 | Van Biljon et al. | |
| 2012/0117611 A1 * | 5/2012 | Wookey | G06F 21/10 726/1 |
| 2012/0150912 A1 * | 6/2012 | Ripberger | G06F 16/24573 707/786 |
| 2012/0278861 A1 | 11/2012 | Lu | |
| 2012/0281706 A1 | 11/2012 | Agarwal et al. | |
| 2012/0331125 A1 | 12/2012 | Li et al. | |
| 2012/0331479 A1 | 12/2012 | Takagi | |
| 2013/0054426 A1 | 2/2013 | Rowland et al. | |
| 2013/0054817 A1 | 2/2013 | Moen et al. | |

(56) References Cited

U.S. PATENT DOCUMENTS

| | | |
|---|---|---|
| 2013/0078598 A1 | 3/2013 | Dunne |
| 2013/0103834 A1 | 4/2013 | Dzerve et al. |
| 2013/0166703 A1 | 6/2013 | Hammer et al. |
| 2013/0219176 A1* | 8/2013 | Akella .................. G06F 16/185 713/165 |
| 2013/0239192 A1 | 9/2013 | Linga et al. |
| 2013/0276070 A1* | 10/2013 | Lee ...................... H04L 63/083 726/4 |
| 2013/0339101 A1* | 12/2013 | Riley ................. G06Q 10/0637 705/7.36 |
| 2014/0040975 A1 | 2/2014 | Raleigh et al. |
| 2014/0068703 A1 | 3/2014 | Balus et al. |
| 2014/0150068 A1 | 5/2014 | Janzer |
| 2014/0164617 A1* | 6/2014 | Jalan ...................... H04L 67/12 709/226 |
| 2014/0211698 A1* | 7/2014 | Aguirre ................ H04L 47/805 370/329 |
| 2014/0233387 A1* | 8/2014 | Zheng .................. H04L 47/125 370/235 |
| 2014/0245373 A1* | 8/2014 | Martin .................. H04L 63/104 726/1 |
| 2014/0351440 A1 | 8/2014 | Madani et al. |
| 2014/0280969 A1* | 9/2014 | Wood .................... H04L 47/125 709/226 |
| 2014/0297866 A1* | 10/2014 | Ennaji ................. G06F 9/45533 709/226 |
| 2014/0297867 A1* | 10/2014 | Ennaji .................... H04L 67/22 709/226 |
| 2014/0297868 A1* | 10/2014 | Ennaji .................... G06Q 30/08 709/226 |
| 2014/0372571 A1* | 12/2014 | Lim .................... H04L 67/1004 709/219 |
| 2015/0128205 A1* | 5/2015 | Mahaffey ................ H04L 63/18 726/1 |
| 2015/0135272 A1* | 5/2015 | Shah ...................... H04L 63/10 726/4 |
| 2015/0143504 A1* | 5/2015 | Desai ..................... H04L 67/02 726/13 |
| 2015/0156065 A1 | 6/2015 | Grandhe et al. |
| 2016/0212012 A1 | 7/2016 | Young et al. |
| 2017/0310709 A1* | 10/2017 | Foxhoven ............... H04L 63/10 |

OTHER PUBLICATIONS

U.S. Non-Final Office Action dated Apr. 23, 2015 issued in U.S. Appl. No. 14/083,227.

U.S. Final Office Action dated Jan. 14, 2016 issued in U.S. Appl. No. 14/083,227.

U.S. Notice of Allowance dated May 4, 2016 issued in U.S. Appl. No. 14/083,227.

U.S. Non-Final Office Action dated Feb. 28, 2017 issued in U.S. Appl. No. 15/243,612.

U.S. Final Office Action dated Aug. 8, 2017 issued in U.S. Appl. No. 15/243,612.

Notice of Allowance dated Oct. 26, 2017 issued in U.S. Appl. No. 15/243,612.

* cited by examiner

ACCOUNT MANAGEMENT SERVICES FOR LOAD BALANCERS

CROSS-REFERENCE TO RELATED APPLICATIONS

This application is a continuation of allowed U.S. application Ser. No. 15/243,612, filed Aug. 22, 2016 entitled "ACCOUNT MANAGEMENT SERVICES FOR LOAD BALANCERS," which is a continuation of U.S. Pat. No. 9,424,429 issued Aug. 23, 2016 and filed Nov. 18, 2013; of which the full disclosure of this application is incorporated herein by reference for all purposes.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

Often, customers wanting to utilize these resources must build or otherwise provide a mechanism for differentiating between users, authenticating users, and otherwise controlling access to various resources provided as part of the cloud offering. This often entails the customer providing some type of user management system that is under control of the customer. Customers often underestimate the complexity of building such a system, and often inadvertently provide systems that are easily broken into by malicious parties. Even large companies often do not implement such systems correctly, as high profile companies have had sites hacked into and passwords stolen, among other such activity.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing access to resources in an electronic environment. In particular, various embodiments provide mechanisms for managing account-related (and other such) functionality using a management service associated with, or incorporated in, a component such as a load balancer or load balancing service.

In various embodiments, electronic resources are provided that are not associated with a specific customer or account. For example, data servers, application servers, virtual machines, and other such resources might be shared among a variety of customers, where the access for each of those customers is determined through the terms of a respective customer account. A customer might utilize these resources for various purposes, such as to provide a website or application that is accessible by end users. Access to a website can be for authorized users only, or the website might provide access to content based at least in part upon an identity of an authorized user, among other such options. In order to manage this access, the customer can subscribe to an account management service, or other such service, that can be integrated in, or associated with, a load balancing component or service. The account management service can be a Web service, for example, that can expose a configurable application programming interface (API), or other such interface, enabling a customer to take advantage of functionality of the service without having to build a dedicated user management system. The account management service can manage sensitive information such as passwords, credit card numbers, social security numbers, phone numbers, and the like, and store this information in a way that is separated from the website components. If the website is compromised or "hacked," confidential user data would not be accessible. Further, by implementing the service at the load balancer all requests to the resources can be intercepted or otherwise processed before reaching those resources, whereby functions such as authentication and authorization can be performed in a way that is visible to the provider and can require no customer involvement, other than building user rules, policies, roles, groups, pools, and/or permissions for determining access to the respective resources. In at least some embodiments, information passed between the service and the resources can use HTTP request and response headers, or other such mechanisms, such that the service does not need to address the technology choice of the resources and/or applications, and web or cloud applications do not have to perform tasks such as authentication or authorization.

Various other applications, processes, and uses are presented below with respect to the various embodiments.

Figure 1:
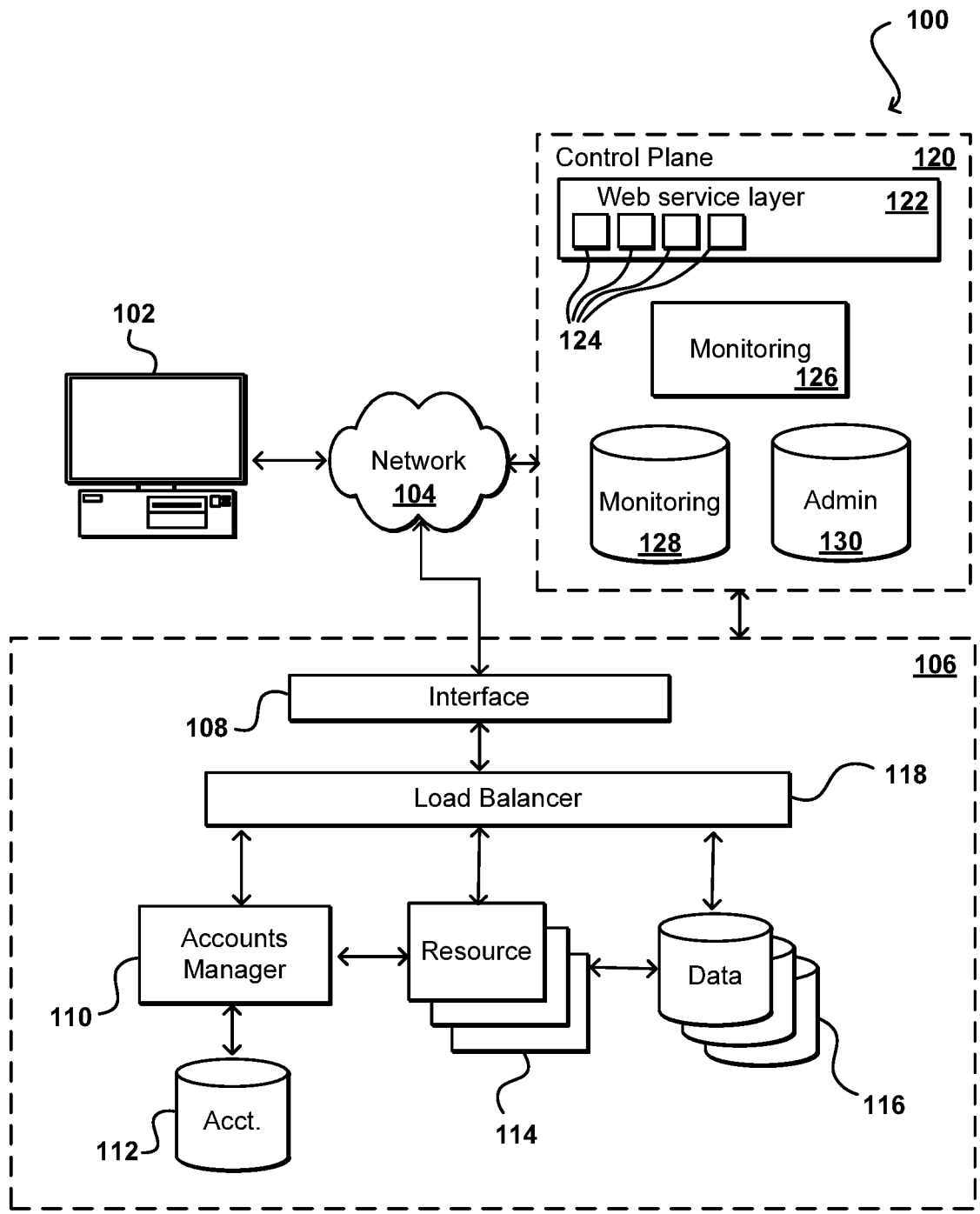
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a control plane 120 or a data plane 106 of a resource provider environment. The client device can include any appropriate electronic device operable to send and receive requests, messages, or other such information over an appropriate network and convey information back to a user of the device. Examples of such client devices include personal computers, tablet computers, smart phones, notebook computers, wearable computers (e.g., watches and glasses), and the like. The at least one network 104 can include any appropriate network, including an intranet, the Internet, a cellular network, a local area network (LAN), or any other such network or combination, and communication over the network can be enabled via wired and/or wireless connections. The resource provider environment, such as may include a multi-tenant and/or cloud computing environment, can include any appropriate components for receiving requests and returning information or performing actions in response to those requests. As an example, the provider environment might include Web servers and/or application servers for receiving and processing requests, then returning data, Web pages, video, audio, or other such content or information in response to the request.

The control plane 106 in this example is essentially a virtual layer of hardware and software components that handles control and management actions, such as provisioning, scaling, replication, etc. The control plane in this embodiment includes a Web services layer 122, or tier, which can include at least one Web server, for example, along with computer-executable software, application servers, or other such components. The Web services layer also can include a set of APIs 124 (or other such interfaces) for receiving Web services calls or requests from across the network 104. Each API can be provided to receive requests for at least one specific action to be performed with respect to the data environment, such as to provision, scale, clone, or hibernate an instance of a relational database. Upon receiving a request to one of the APIs, the Web services layer can parse or otherwise analyze the request to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 130, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane can include what is referred to herein as a "sweeper" component (now shown). A sweeper component can be any appropriate component operable to poll various components of the control plane or otherwise determine any tasks to be executed in response to an outstanding request. In this example, the Web services layer might place instructions or information for the "create database" request in the admin data store 130, or a similar job queue, and the sweeper can periodically check the admin data store for outstanding jobs. Various other approaches can be used as would be apparent to one of ordinary skill in the art, such as the Web services layer sending a notification to a sweeper that a job exists. The sweeper component can pick up the "create database" request, and using information for the request can send a request, call, or other such command to a workflow component operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

An example "create database" workflow for a customer might include tasks such as provisioning a data store instance, allocating a volume of off-instance persistent storage, attaching the persistent storage volume to the data store instance, then allocating and attaching a DNS address or other address, port, interface, or identifier which the customer can use to access or otherwise connect to the data instance. In this example, a user is provided with the DNS address and a port address to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 106, and provide the DNS address to be used to access the instance. A user then can access the data store instance directly using the DNS address and port, without having to access or go through the control plane 120. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

The control plane 120 in this embodiment also includes at least one monitoring component 126. When a data instance is created in the data plane, information for the instance can be written to a data store in the control plane, such as a monitoring data store 128. It should be understood that the monitoring data store can be a separate data store, or can be a portion of another data store such as a distinct set of tables in an Admin data store 130, or other appropriate repository.

A monitoring component can access the information in the monitoring data store to determine active instances in the data plane 106. A monitoring component also can perform other tasks, such as collecting log and/or event information from multiple components of the control plane and/or data plane, such as the Web service layer, workflow component, sweeper component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each instance in the data plane can include a host manager component. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor, as well as monitoring for error conditions such as I/O errors or data storage errors. A host manager can also perform and/or mange the installation of software patches and upgrades for the data store and/or operating system. A host manger also can collect relevant metrics, such as may relate to CPU, memory, and I/O usage.

The monitoring component can communicate periodically with each host manager for monitored instances, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 130 or another such job queue to perform an action for the instance, such as to verify the problem and re-provision the instance if necessary. The sweeper can access this information and kick off a recovery workflow for the instance to attempt to automatically recover from the failure. The host manager can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 106 through the network using a Java Database Connectivity (JDBC) or other such client to directly interact with that instance. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user or application, for example, can be directed to a network address translation (NAT) router, or other appropriate component, which can direct the request to the actual instance or host corresponding to the DNS of the request.

In various embodiments, the data plane 106 may include various types of resources that can be utilized by multiple customers and/or users for a variety of different purposes. In at least some embodiments, all or a portion of a given resource or set of resources might be allocated to a particular customer or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, a customer can also reserve at least a portion of one or more resources, which then can be available to that customer or end users associated with that customer. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the data plane 106. The interface layer can include application programming interfaces (APIs) or other exposed interfaces enabling a user to submit requests to the provider environment. The interface layer 108 in this example can also include other components as well, such as at least one Web server, routing components, network switches, and the like. Requests passing through the interface layer 108 can be directed to another layer, such as a load balancing layer 118 that can include one or more load balancers implemented in hardware and/or software. The load balancer layer can perform various functions known for such purposes, such as to determine the relative loads on resources and/or utilize various load balancing algorithms in order to spread work over a plurality of resources 114, at least of a certain type or class. Load balancing algorithms include round robin algorithms, scheduling algorithms, dynamic distribution algorithms, and the like.

When a request to access a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, or is associated with a customer having such an account, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The credentials can be validated against information stored for the account. If the user has, or is associated with, an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, there are elaborate constructs built around aspects of a multi-tenant resource environment, such as identities, accounts, resource ownership, and resource access. In at least some situations, the elaborate nature of the environment can require unnecessary complexity and/or unnecessary steps when a customer of the provider environment wants to provide end users with access to resources allocated to the customer, such as may be used to support a website or application provided by the customer. As mentioned, this often involves the customer building a user management system that is able to recognize and validate user credentials, determine access to resources for specific types of users, and perform various other user management activities. The complexity often results in the customer providing a management system that is susceptible to attack or other unauthorized access, which can result in the manipulation of code or data stored by those resources and/or extraction of data such as passwords or financial data. Such access can be very damaging to the reputation and business of the customer. Further, providing such a system is very time and resource intensive, and comes with a significant cost to the customer. The customer also must update the system over time to support new technologies and protocols, address new types of threats, etc.

Accordingly, systems and methods in accordance with various embodiments can provide an account management service, or other such system or service, that can be leveraged by a customer such that the customer does not need to build or operate a dedicated user management system. Such an account management service can be implemented at the load balancing level in at least some embodiments, whether incorporated into, or accessible by, one or more load balancing components or a load balancing service. By implementing at the load balancing level, unauthorized requests can be detected before those requests are received by the targeted resources, preventing unauthorized access to data stored by those resources. Further, such a location enables a provider of the resource environment to monitor traffic and determine various usage statistics, which can be useful for tasks such as billing and resource allocation. Such a service can also leverage other services, which can be useful for tasks such as session creation, user account creation, user authentication, and the like. An accounts management service can enable a customer of the provider to build user roles, access policies, user groups, user pools, user permissions, and/or other such data that the accounts management service can utilize to manage users and access to resources under the customer account.

Figure 2:
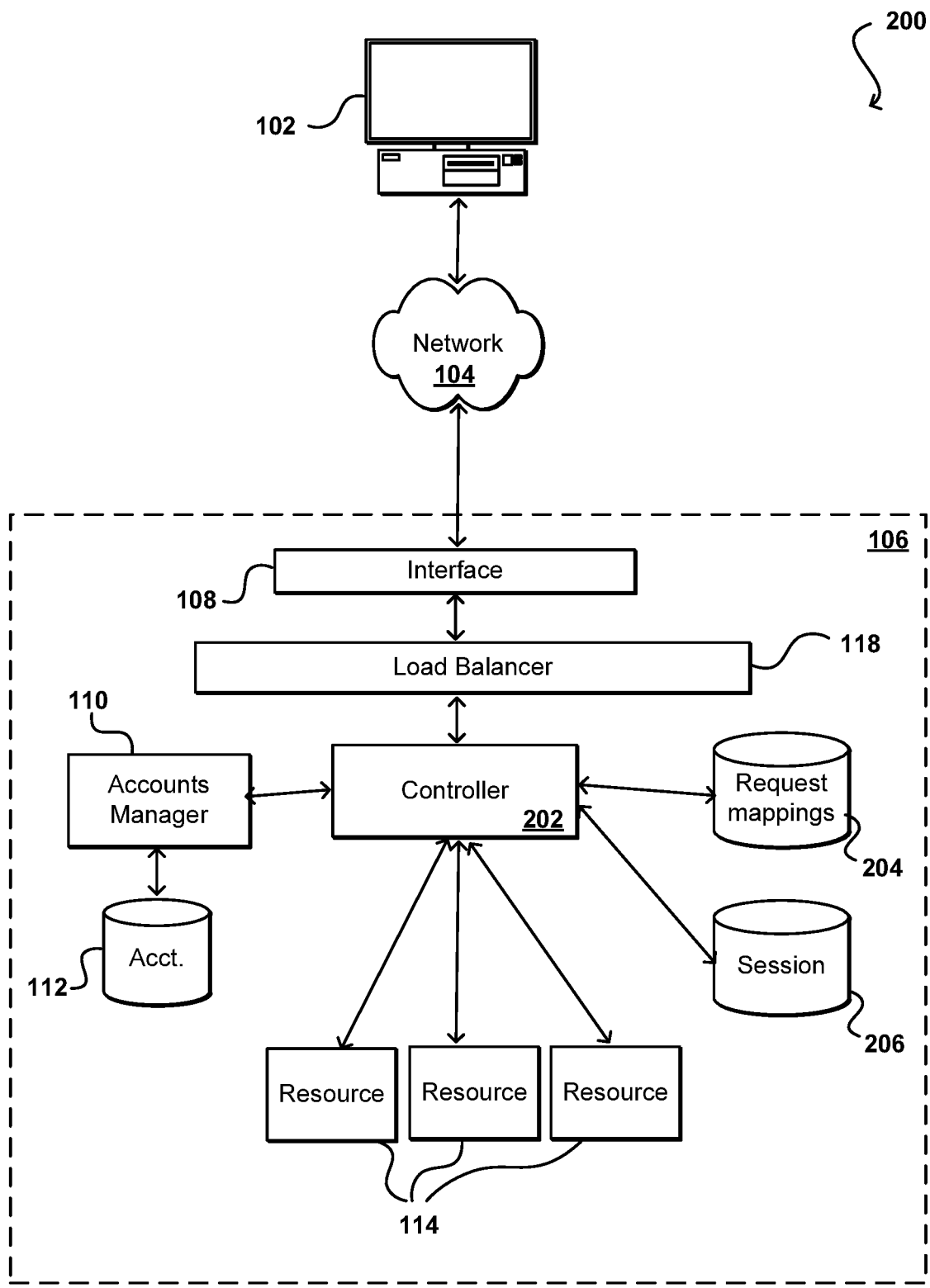
FIG. 2 illustrates an example environment in which the load balancer is associated with a management service that can be used in accordance with various embodiments.

FIG. 2 illustrates an example configuration 200 wherein an account management service can be utilized by a load balancer in accordance with various embodiments. It should be understood that reference numbers may be carried over between figures to designate like components for purposes of simplicity of explanation, but such usage should not be interpreted as a limitation on the scope of the various embodiments. In this example, a controller 202 is utilized with one or more load balancer 118 components of a load balancing layer (physical or logical) to intercept all requests between the load balancing layer and the targeted resources 114. The controller 202, implemented through hardware and/or software as part of the account management service, can work with an accounts manager component 110 to perform tasks such as authentication and authorization for incoming requests. Because the account management functionality is implemented as a service, such as a web service, customers can subscribe to the service and leverage the functionality, which can eliminate the need for those customers to build their own accounts management system. Another benefit is that end users of a site or application provided by the customer will have increased security with respect to user data such as passwords or other private information, such as credit card numbers or financial data, phone numbers, social security numbers, email addresses, and the like. This information can be stored in a location that is separate from the resources 114 used for web front ends, for example, such as may be stored in an accounts data store 112 accessible by the accounts manager component 110 of the account management service. As mentioned, if the web front ends are ever hacked or otherwise accessed through an unauthorized approach, the requests will not be able to access the confidential user data. The confidential user data in such an environment also would also be protected from employees who often have access to user data in conventional systems.

In some embodiments, users will submit requests that are received over the at least one network 104 to the interface layer 108 and then directed to the load balancing layer 118. As mentioned, the load balancing layer can perform tasks such as to determine a type of request, or type of resource 114 needed to process the request, or allocated resources 114 associated with the request, and then determine one or more appropriate resources to receive information for the request using a load balancing algorithm or other such process. As part of the load balancing process, the load balancer can also direct at least a portion of the requests to a controller component 202 of the account management service, such as when the load balancer identifies the request as being, at least allegedly, associated with a customer account that has subscribed to the accounts management service, or otherwise being governed by one or more rules or policies for accessing the target resource(s). The controller 202 can check information stored in a request mappings data store 204, or other such location, to determine whether a policy exists for the request. For example, the controller can determine a uniform resource locator (URL) or other link or address to which the request was sent, and can attempt to locate a policy in the request mappings data store 204 that applies to that URL. If no policy exists, the controller can pass the request on to the appropriate resource(s), return an error message or page, or perform another such action. If a policy exists, the controller can attempt to determine if the policy is satisfied before determining whether to forward the request to the appropriate resource(s) or reject the request, among other such options. For example, a policy for a URL might indicate that a request has to be associated with an existing user account that has permission to access content associated with that URL. If the request is associated with such an account, such as may be validated using one or more credentials associated with the request, the request can be forwarded appropriately. If not, the request can be denied or the request can be directed to a service that enables a user associated with the request to add or update an account to receive such permission. In some embodiments, the controller can also check a session data store 206, or other such location, to determine whether a current session exists for the user associated with the request. If not, the controller can direct information for the request to a session management component (not shown) or other such device or service operable to initiate a session for the user. Various other such functionality can be implemented as well within the scope of the various embodiments. An advantage to using a session data store is that as additional instances and/or resources are implemented or instantiated, those instances and/or resources can be aware of all existing sessions by contacting the sessions data store using an appropriate API, where permitted. Sessions also can be routed to new instances or resources as needed, such that the sessions survive in the event of a resource failure or other such event.

In at least some embodiments, information can be passed between the account management service and the resources, or the applications running on those resources, using a conventional protocol approach, such as by passing information in HTTP request and response headers. Communicating using such mechanisms enables the account management service to communicate independent of the technology choice of those applications, such as whether an application uses Java® or PHP. The applications also do not need to perform authorization and/or authentication, as these tasks are handled by the account management service.

A customer of the provider environment can utilize an interface (e.g., a programmable API) of the account management service in order to perform certain configuration tasks for the account management service. For example, a customer can establish one or more account pools through the service, which can enable the service to perform various tasks relating to those pools, such as user registration, multi-factor authentication, password establishment and recovery, and the like. Such an approach enables the user sign-in experience to be integrated into the load balancer layer 118. The customer can also select one or more policy-based controls for requiring login and/or session management in order to access certain resources, pages or applications supported by those resources, etc. The customer can configure or enable various other functionality through the service as well. These can include, for example, billing, protection against denial of service (DoS) attacks, federation integration, mobile integration, interoperabilty with authenticated endpoints, sign-out across a resource cluster, single sign-in across applications, automatic bot mitigation, support for multiple sign-in technologies and password alternatives, business analytics, and advertising, among other such options.

As mentioned, the accounts manager component 110 can provide an API or other interface to the account data store 112. The accounts manager can support functionality such as user or request validation, group determination, role determination, and permission determination, and can provide one or more APIs for managing each type of data. The data in the accounting data store 112 can be encrypted using one or more keys or credentials, as may be managed by the account management service or a related key management service, among other such options. The controller component 202 can be responsible for tasks including security checks, such as user authentication, authorization, and session management. As mentioned, the controller can utilize data in a request mappings data store 204 and/or session data store 206 in order to perform these tasks. In some embodiments, the request mappings data store 204 can contain metadata describing which permissions are required to access which resources. In some embodiments, a mapping entry (here in JSON) might look like the following:

```
{ path: "/admin/*", roles: ["admin"] , notFoundPage: "...",
  loginPage: "/login.jsp", badCredentialPage: "..." },
``` which would tell the controller to, when a request matching the pattern "/admin/*" is received, check the session to determine whether the user is authenticated with the "admin" role (although other policies and permissions can apply as well in other examples). If the user is not authenticated with that role, instead of passing the request to the resource the controller can forward a login URL, redirect to a login or error page, or otherwise cause the user to attempt to obtain the necessary permission or credentials for the desired action. The session data store 206 can be accessible in some embodiments using at least one API, enabling the controller and the various resources to access the sessions data base as needed. In some embodiments, the session data store can be backed using a caching service, or other such component, which can simplify the work of session replication and make web sites and/or applications more compatible with auto-scaling in at least some embodiments.

The account management service can handle various types or pools of users as well. For example, a website hosted by a set of resources might have anonymous users with no login information available, as well as registered users who can obtain different levels of access to the resources based at least in part upon whether the registered users have logged into the system or otherwise provided their respective credentials. The account management service can manage these and other types of users, as discussed elsewhere herein, which enables customer to provide sites and applications that utilize this functionality without requiring the customer to build and manage such a system, which can potentially have security flaws or other issues as mentioned. Another advantage is that user management does not add direct value to the customer, and removing the responsibility for such functionality from the user reduces cost and effort on the part of the customer. Further, such functionality can provide additional benefits as well, such as compliance benefits and elimination or significant reduction of a large class of risk to the business. Leveraging an account management service can also reduce the complexity of the code needed to provide the site or application, etc. For example, a significant portion of a conventional webpage is dedicated to security, but with the security being externalized as a service the amount of security code needed on the page is significantly reduced. Further, advances in security can be implemented by the service, such that the customer can automatically get the benefit of the update without need to learn, implement, troubleshoot, and manage the new technology. In at least some cases, the customer might not even be aware of new security technology that has been implemented. A customer can instead cause user traffic to use the load balancing service as an entry point, with the resources sitting behind the load balancing service, and traffic can automatically have the security functionality applied and managed by the load balancer service, in conjunction with the account management service, before the traffic reaches the target resource(s). The customer thus can have reduced management responsibility in a management console for the system, for example, and the architecture for utilizing the resources can be kept relatively simple and/or clean.

Figure 3:
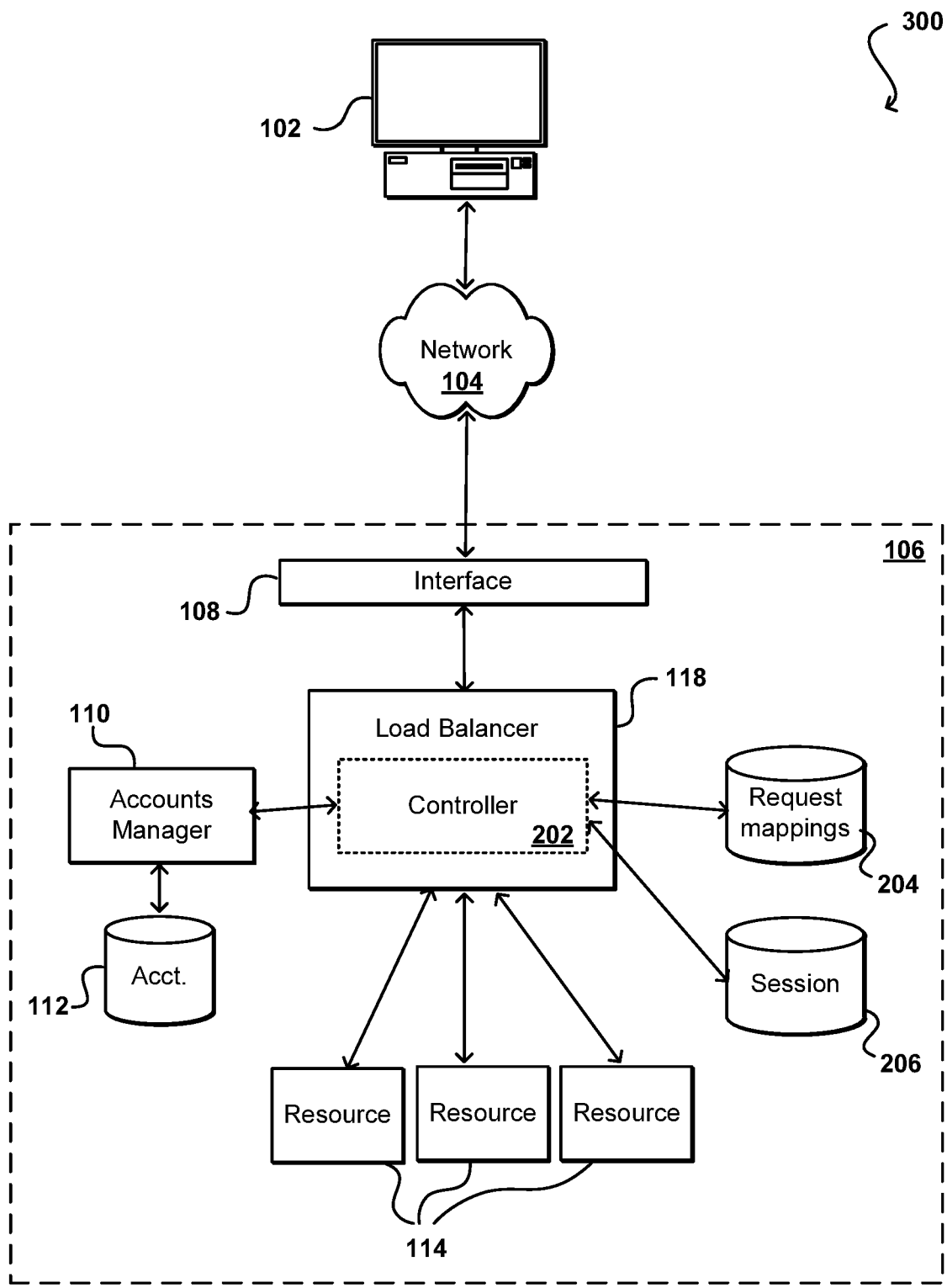
FIG. 3 illustrates an example environment in which the load balancer includes management service components that can be used in accordance with various embodiments.

As mentioned, at least a portion of an account management service can also be integrated in a load balancer, load balancer service, or load balancing layer in at least some embodiments. For example, FIG. 3 illustrates another example configuration 300 wherein the controller 202 is contained within, or integrated into, the load balancing layer 118. Account management can then be performed in conjunction with load balancing, such that requests that have not yet been authenticated or authorized, or are not yet able to access the target resources, do not need to be processed by the load balancing algorithm, which can reduce cost and processing time. Such an approach can potentially provide for contention in the event of a DoS attack, however, such that controls should be put in place to make sure that legitimate traffic can be directed as needed, at least to the resources that are not under attack. Accordingly, in at least some embodiments incoming requests might still be processed using the load balancing algorithm before being processed by the account management service, such that traffic without policies to be enforced or traffic that is already authenticated can be passed on to the target resources and not be blocked by the traffic being processed by the account management service.

It should be understood that the account management service can be implemented in other locations in such an environment as well. As discussed, the service can be integrated with a load balancing service or called by the load balancing service. In some embodiments, the account management service can be proximate to the resources themselves. The result, however, is still a configurable load balancer that is capable of performing session management and enforcing authentication and authorization. The load balancer can also enable customers to define and control users, as well as the access to resources obtained by those users, or this functionality can be provided by another user management service that is coupled to the load balancer.

Figure 4:
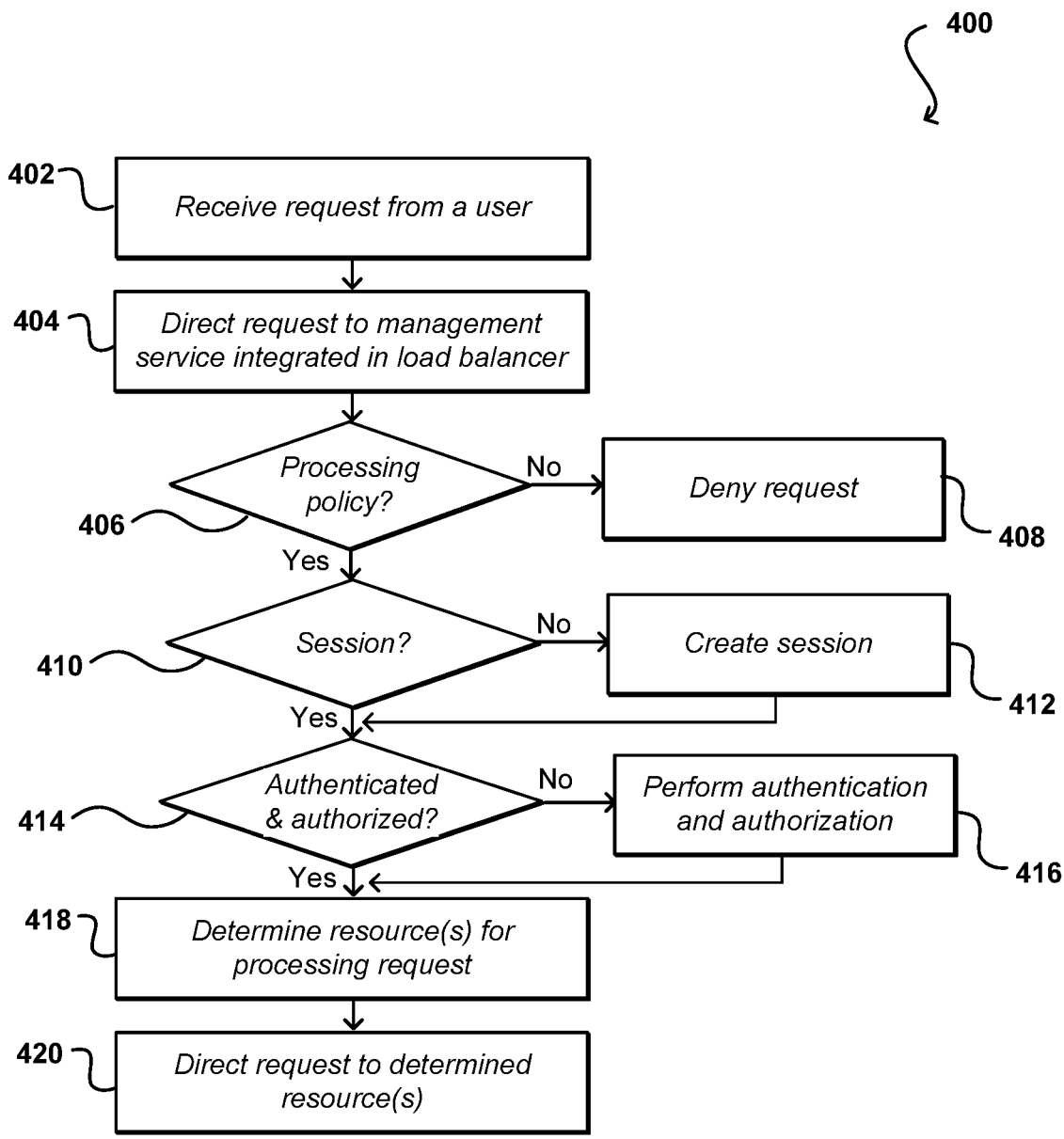
FIG. 4 illustrates an example process for utilizing an account management service with a load balancer that can be utilized in accordance with various embodiments.

FIG. 4 illustrates an example process 400 for utilizing a configurable load balancer with integrated security functionality (e.g., authentication and authorization services) that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a request is received 402 from a user to a resource environment, where the request generally will be a request to access a page, application, or other object provided by a customer of the resource environment using one or more resources of the environment. The request can be directed 404 to an account management service integrated in, or otherwise associated with, a load balancer or load balancing service, for example. The account management service can perform a lookup, such as in a request mappings data store, to determine 406 whether the request matches a pattern corresponding to a processing policy. This can include, for example, requesting a specific URL, including a specified type of token, providing a type of credential, including specific content or metadata, etc. If the request does not match a processing policy, in at least some embodiments the request can be denied 408. In other embodiments, the request can be directed to another page that enables a user submitting the request to perform tasks such as creating an account, logging in, etc.

If a corresponding policy is located, the policy can be analyzed to determine any criteria that must be met before providing access, or at least a certain type of access, to the target resources. As an example, this can include determining whether the user has an account that exists and whether the user has permission to access the target resource(s) in the way requested. In many cases, the account management service will attempt to determine 410 whether there is a current session associated with the request. The lack of a current session can indicate that the user has not yet been authenticated, which would have triggered the creation and/or maintenance of a user session. If a session does not exist, a session can be created 412, either before or after the user is authenticated. A determination also can be made 414 as to whether the user has been authenticated, such as through presentation of one or more appropriate credentials, as well as whether the user is authorized to obtain the type of access associated with the request. The authorization can be determined at least in part by analyzing the criteria set forth in the matching processing policy and determining whether those criteria are met for the request. This can include the user being of a certain type, being associated with a certain pool of users, having a certain type of account, etc. If needed, authentication and/or authorization can be performed 416 via the account management service. As discussed, this can involve verifying user credentials, checking status in an account data store, having a user log in, etc. Once the user is authenticated and authorized, the appropriate resources for the request can be determined 418, such as by determining a type of resource for the request according to customer account information and then determining a specific resource of that resource type according to a selected load balancing algorithm. The request, or at least information for the request, then can be directed 420 to the determined resource(s). If the user is unable to be authenticated and/or authorized, the request might be denied or the user might be directed to other pages as discussed elsewhere herein, among other such options.

In at least some embodiments, a user who is not yet registered or authenticated can opt in to a user registration workflow that is able to collect information and create a new user account that can be hosted in the provider system via the account management service. The account data store can also store information for resources that do, or do not, require the user to be logged in, have an active account, have an active session, etc. In some embodiments, this can include path matching, based at least in part on the subset of the subset of resources being served, whereby the load balancer inserts information about the logged in user and the resources can be configured to reject requests without such information. Thus, in at least some embodiments a load balancer can require a user to become logged in before access can be granted. Aspects such as session state management, identity creation, forgotten password management, etc., can be managed for pools of users associated with a customer account. The account management service of the load balancer can also handle tasks such as billing integration to allow payment processing and subscription management, among other such aspects. And as discussed, this and other functionality can be provided via an API programmable hosted service through a load balancer interface.

An account management service as discussed herein can also implement various other functionality, whether directly or in conjunction with one or more "helper" services. As an example, such a service can provide for protection against, or mitigation of, attacks such as denial of service (DoS) attacks. A load balancer with such functionality can distinguish between legitimate and illegitimate traffic, and therefore can enforce various rules for blocking or redirecting traffic. The ability to block traffic before that traffic reaches the targeted resources can prevent those resources from getting overloaded during attempted attacks. Since the load balancer is at least partially under the control of the resource provider, who then can have at least some visibility into the received traffic, the load balancer can do things that a generic hardware or software mitigation component cannot, where those are typically under complete control of the customer. A load balancer can contact the provider and/or provider system to request upstream mitigation of the attack traffic. Since the provider has visibility into the type of traffic triggering the alarm and/or request, the provider can reasonably believe that the traffic is malicious, and therefore can push policies to black hole the traffic at a network border rather than at the load balancer, which itself could also potentially become overwhelmed by this type of traffic. In at least some embodiments, a controller component can utilize data in a request mappings data store to determine what a legitimate request should look like and reject bad requests. Additional policies relating to such aspects as request rate and geographic location can also be used to potentially identify malicious or suspicious requests. Development in machine learning to identify DoS attacks could also be applied without customers having to do the hard work of building the functionality into their applications.

As discussed, the service can also provide general account maintenance functionality. This can include many aspects of end user account management, such as registration, signup, credential maintenance, password reset, data collection, statistics generation, and the like, all supported by the load balancing service. Having visibility into the user traffic enables monitoring of how users utilize and/or behave within the resource environment, which can be useful for tasks such as resource development and expansion, as well as billing and enforcement of access limitations, among others. The account management service can also be responsible for disabling accounts after a certain number of failed login attempts and handling password recovery without web applications having to deal with the mundane process of accounts management.

Various other functionality can be provided via the load balancer service as well. For example, support for multi-factor authentication and/or federated identities can be provided through relatively simple configuration. In some embodiments, the account management service can provide one or more APIs for sending email to users without the web application needing to know, or having access to, the user email addresses. Sending messages to groups or users with certain permissions can also be supported. The account management service can also connect to an active directory service, for example, and provide automatic single sign on support for corporate web applications hosted in the resource provider environment.

Figure 5:
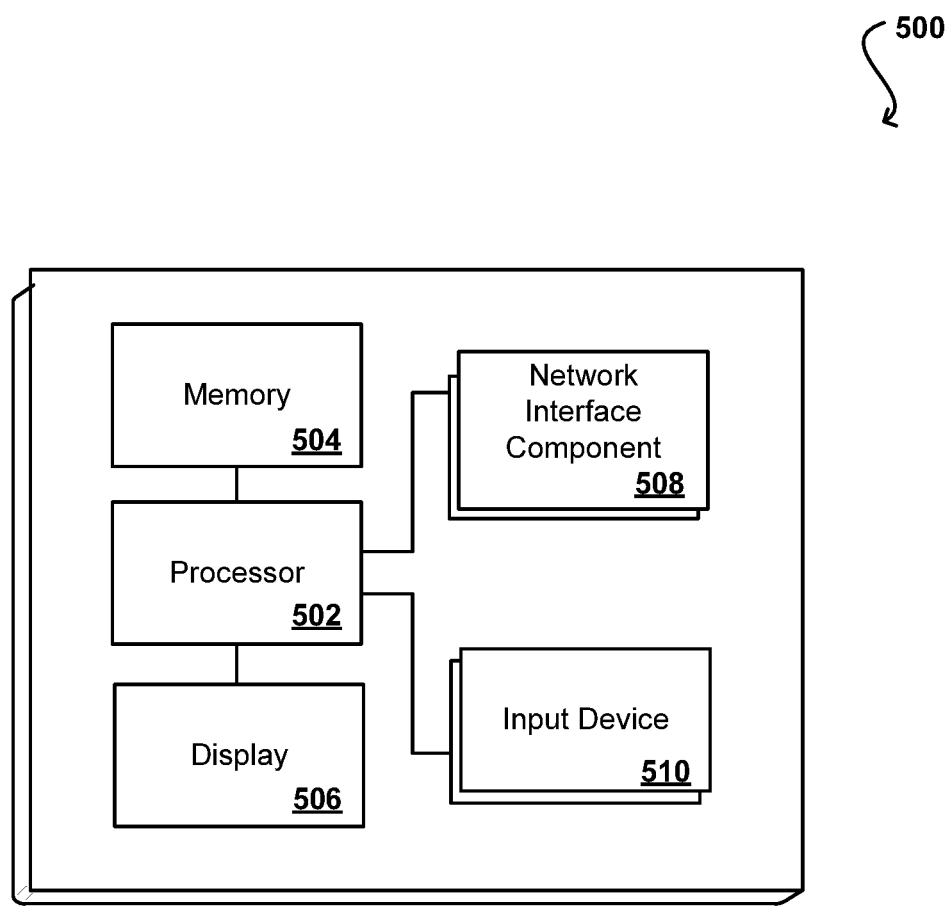
FIG. 5 illustrates example components of a computing device that can be utilized in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device may include some type of display element 506, such as a touch screen or liquid crystal display (LCD), although devices such as portable media players might convey information via other means, such as through audio speakers. The device can include one or more network interface components 508 configured to enable the device to transmit and receive information over a network. As discussed, the device in many embodiments will include at least one input element 510 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIGS. 1 and 2. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   a load balancer including a memory coupled to a processor, the memory including instructions that upon execution cause the load balancer to:
   receive a request from a user to access one or more services provided by a customer of an account management service, wherein electronic resources of a resource environment are utilized to provide the one or more services to users on behalf of the customer;
   determine that the user has not been authenticated;
   in response to determining that the user has not been authenticated, direct at least a portion of the request to an account management service integrated into the load balancer and configured to:
   determine that the user, corresponding to the request, corresponds to a determined pool of accounts of one or more pools of accounts of the customer; and
   verify that the user is authorized, according to a respective policy associated with the determined pool of accounts, to obtain the access;
   in response to the user being authorized, determine, using at least one load balancing algorithm, one or more processing resources of the electronic resources for processing the request, the at least one load balancing algorithm causing the load balancer to distribute processing tasks; and
   transmit information for processing the request to the one or more processing resources.

2. The system of claim 1, wherein the system further comprises an interface for enabling the one or more pools of accounts to be defined for the customer, each pool of accounts associated with a respective policy indicating one or more criteria for providing access to the plurality of electronic resources, wherein the interface is an application programming interface (API) that further enables the customer to manage one or more aspects of the one or more pools of accounts.

3. The system of claim 2, wherein the one or more aspects includes at least one of a type of authentication to be performed, a type of authorization to be performed, a type of registration to be performed, a method for password establishment, a method of password recovery, a type of resource access, or an amount of resource access for at least one pool of the one or more pools of accounts.

4. The system of claim 1, wherein the one or more electronic resources are offered in a multi-tenant environment, and wherein each resource of the one or more electronic resources is capable of being accessed in association with an account of the customer.

5. The system of claim 1, wherein each account of the one or more pools of accounts is associated with one or more users.

6. The system of claim 1, wherein the account management service is further configured to:
   authenticate the user according to the respective policy, to obtain the access to one or more of the plurality of the electronic resources.

7. A computer-implemented method, comprising:
   receiving, via a load balancer of a multi-tenant computing resource environment, a request initiated by a user to access one or more services provided by a customer of an account management service, wherein electronic resources of the resource environment are utilized to provide the one or more services on behalf of the customer;
   determining that the user has not been authenticated;
   directing at least a portion of the request to an account management service integrated into the load balancer;
   determining, via the account management service, an account pool associated with the user, the account pool being determined from a set of account pools established by the customer, each account of the set of account pools being associated with one or more users;
   determining, via the account management service, a policy specified for the account pool, the policy indicating one or more criteria for processing the request using one or more electronic resources; and
   determining, via the account management service, that the request satisfies the one or more criteria;
   in response to the request being determined to satisfy the one or more criteria, selecting, via the load balancer, one or more processing resources of the electronic resources to process the request; and
   transmitting information for the request to the one or more processing resources.

8. The computer-implemented method of claim 7, further comprising:
   receiving a modification request from the customer to modify the set of account pools, the request specifying at least one task corresponding to at least one of adding a new account pool, deleting an existing account pool, modifying a type of user associated with an existing account pool, modifying a type of authentication to be used for the existing account pool, or modifying a type of resource access granted for the existing account pool.

9. The computer-implemented method of claim 7, wherein the step of determining that the request satisfies the one or more criteria further includes:
   determining that the request associated with a user has been authenticated to the load balancer or has permission to access a resource type of the selected resource.

10. The computer-implemented method of claim 7, further comprising, via the account management service:
    authenticating the user before determining that the user is authorized, according to the respective policy, to obtain the access to one or more of the electronic resources.

11. The computer-implemented method of claim 7, further comprising:
    determining that the electronic resources include at least one of data servers, application servers, data stores, or virtual machines.

12. The computer-implemented method of claim 7, further comprising:
    denying a second request at the load balancer in response to the account management service determining that a second request does not satisfy the one or more criteria.

13. The computer-implemented method of claim 7, further comprising:
    causing sensitive information for the user to be stored in a data store separate from the one or more electronic resources and accessible by the load balancer, wherein a party gaining unauthorized access to of the one or more electronic resources is unable to access to the sensitive information.

14. The computer-implemented method of claim 7, wherein the load balancer includes a memory coupled to a processor, and further comprising:
    causing, via the memory, the load balancer to perform a task for the request, the task being determined based at least in part upon the determined pool of accounts associated with the user, the task including at least one of session creation, user account creation, multi-factor authentication (MFA), password establishment and recovery, protection against denial of service (DoS) attacks, federation integration, mobile integration, sign-out across a resource cluster, single sign-in across applications, automatic bot mitigation, support for multiple sign-in technologies and password alternatives, business analytics, or advertising.

15. A system, comprising:
    at least one processor; and
    memory including instructions that, when executed by the at least one processor, cause the at least one processor to:
    receive, via a load balancer of a multi-tenant computing resource environment, a request initiated by a user to access one or more services provided by a customer of an account management service, wherein electronic resources of the account management service are utilized to provide the one or more services on behalf of the customer;
    determine that the user has not been authenticated;
    direct at least a portion of the request to an account management service integrated into the load balancer and configured to:
    determine an account pool associated with the user, the account pool being determined from a set of account pools established by the customer, each account of the set of account pools being associated with one or more users;
    determine a policy specified for the account pool, the policy indicating one or more criteria for processing the request using one or more processing resources of the electronic resources; and
    cause the policy to be evaluated in order to determine that the request satisfies the one or more criteria;
    in response to the request being determined to satisfy the one or more criteria, select the one or more processing resources of the electronic resources to process the request; and
    transmitting information for the request to the one or more processing resources.

16. The system of claim 15, wherein the instructions when executed further cause the system to:
    determine whether the request is authorized; and
    cause similar requests to be filtered when the request is determined to be unauthorized.

17. The system of claim 15, wherein the instructions when executed further cause the system to:

cause the user to be authenticated before evaluating the policy.

18. The system of claim 15, wherein the instructions when executed further cause the system to:
monitor user requests received by the load balancer; and
generate usage statistics for each of a plurality of users associated with a respective user request.

19. The system of claim 15, wherein the instructions when executed further cause the system to:
determine security state information including at least one of whether the user is authenticated, whether the user is authorized to access the one or more electronic resources, or whether the user has an account with at least one of the customer or a provider of the multi-tenant computing environment before forwarding the information for the request to the determined one or more electronic resources; and
include at least a portion of the security state information in the information forwarded to the determined one or more electronic resources.

20. The system of claim 15, wherein the instructions when executed further cause the system to:
store usage data for the request, the usage data capable of being used for at least one of billing or metering traffic received to the load balancer, wherein the billing includes at least one of generating accounting records or causing charges to be accrued for the traffic received to the load balancer.

* * * * *